United States Patent [19]

Chen

[11] Patent Number: 5,285,910

[45] Date of Patent: Feb. 15, 1994

[54] ROTATABLE CLOTHING HANGER ASSEMBLY

[75] Inventor: Kuang P. Chen, Taipei, Taiwan

[73] Assignee: Lu Kuang Enterprise Co., Ltd., Taipei, Taiwan

[21] Appl. No.: 942,146

[22] Filed: Sep. 8, 1992

[51] Int. Cl.$^5$ .............................................. A47F 5/02
[52] U.S. Cl. ..................................... 211/162; 211/122
[58] Field of Search ............... 211/122, 162, 163, 168, 211/169

[56] References Cited

U.S. PATENT DOCUMENTS

| | | | |
|---|---|---|---|
| 2,008,115 | 7/1935 | Taylor | 211/169 |
| 3,039,614 | 6/1962 | Rutkovsky et al. | 211/122 |
| 3,139,191 | 6/1964 | King | 211/122 |
| 3,368,688 | 2/1968 | Weiss et al. | 211/122 |
| 3,780,852 | 12/1973 | Weiss et al. | 211/122 |
| 3,960,273 | 6/1976 | Weston | 211/169 |
| 4,625,874 | 12/1986 | Abe et al. | 211/122 |
| 5,062,536 | 11/1991 | Tsai | 211/122 |

Primary Examiner—Paula A. Bradley
Assistant Examiner—Erik R. Puknys
Attorney, Agent, or Firm—Benman & Collins

[57] ABSTRACT

A clothing hanger assembly includes an upper loop track and a lower loop track and a rack connected therebetween for supporting the upper loop track and the lower loop track. A plurality of hanger units are slidably coupled between the upper loop track and the lower loop track and linked to each other, thereby having a synchronous revolution along the upper loop track and the lower loop track when operated by a user. Each hanger unit includes an upper sliding device and a lower sliding device and a clothing hanger frame rotatably coupled therebetween, such that the upper sliding device and the lower sliding device are used to execute the synchronous revolution along the tracks while the frame can have a free rotation about an axis therethrough when operated by the user.

8 Claims, 5 Drawing Sheets

ROTATABLE CLOTHING HANGER ASSEMBLY

FIELD OF THE INVENTION

This invention relates to a rotatable clothing hanger assembly, especially to one which has a plurality of hanger units which can revolve synchronously along two parallel loop tracks with each hanger unit being able to rotate freely about an axis therethrough.

BACKGROUND OF THE INVENTION

Rotatable clothing hanger assemblies used at the present time, are typified by such a patent example as U.S. Pat. No. 5,062,536, which discloses a rotatable hanger assembly having a plurality of hanger units pivotally and slidably coupled together between an upper track and a lower track, such that all hanger units are moved in concert along the tracks and clothing hung thereon can be reached easily. However, there is still one drawback of the previous hanger, in that, each hanger unit is not permitted &.o rotate about an inner axis, thus occupying a lot of space in the whole hanger assembly.

SUMMARY OF THE INVENTION

The primary objective of the present invention is to provide a rotatable clothing hanger assembly including a plurality of hanger units for hanging clothes thereon, each of which can be rotated independently and together can be moved synchronously along two parallel loop tracks for easily handling the clothes hung thereon.

In accordance with one aspect of the invention, a clothing hanger assembly which includes an upper loop track and an identically shaped lower loop track is provided. The two tracks are supported by a rack such that the upper track is parallel to the lower track. A plurality of hanger units are slidably coupled between the upper track and the lower track and linked to each other by an upper linking bar and a lower linking bar such that the hanger units can move in concert along the tracks when operated by a user. Each hanger unit includes an upper sliding means and a lower sliding means with a clothing hanger frame rotatably connected therebetween, such that the hanger units can revolve along the tracks when a user operates the upper/lower sliding means, and any of the clothing hanger frames can rotate freely about an axis therethrough when the user operates on a specific clothing hanger frame.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
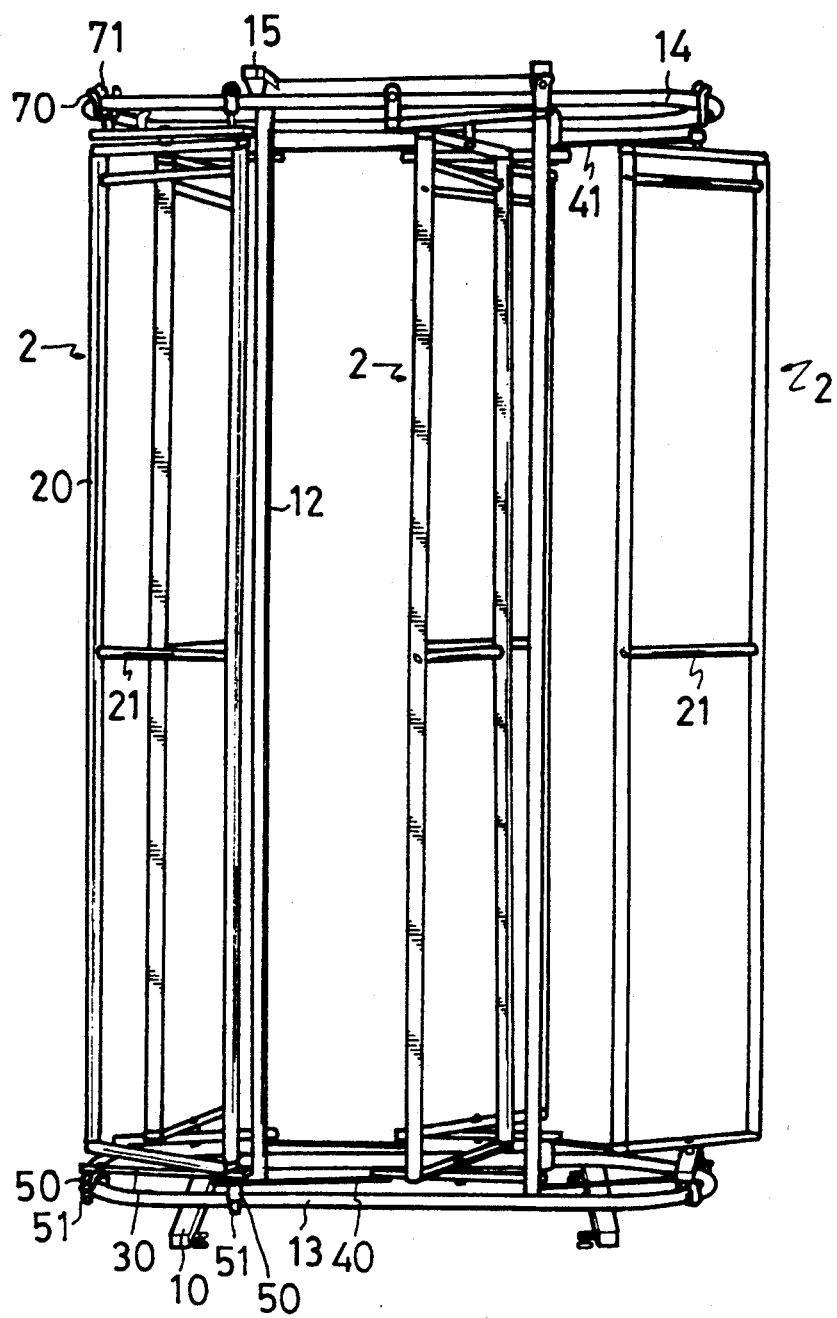
FIG. 1 is a perspective view of a clothing hanger assembly in accordance with the present invention.

Referring to FIG. 1, a rotatable clothing hanger assembly comprises a rack having an upper rack frame 15, a lower rack frame 10 and a pair of spaced posts 12 connected therebetween. The upper rack frame 15 and the lower rack frame 10 are similarly formed as horizontal H-shaped structures, both of which are parallel to each other, and each of the spaced posts 12 is engaged between two interaction points of the H-shaped structure of the upper and the lower rack frames. An upper loop track 14 is mounted on the upper rack 15 and supported thereby. A lower loop track 13 having the same shape as the upper loop track 14 is mounted on the lower rack frame 10 and supported thereby, such that both tracks 13 and 14 are fixed on the rack and are parallel to each other.

A plurality of hanger units 2 are slidably mounted between the upper track 14 and the lower track 13 and linked to each other, thereby permitting each hanger unit to rotate in concert with each other along the upper track 14 and the lower track 13 when operated by a user. Each hanger unit 2 also has a free rotation about an axis therethrough when operated by the user, which is to be described later.

Figure 2:
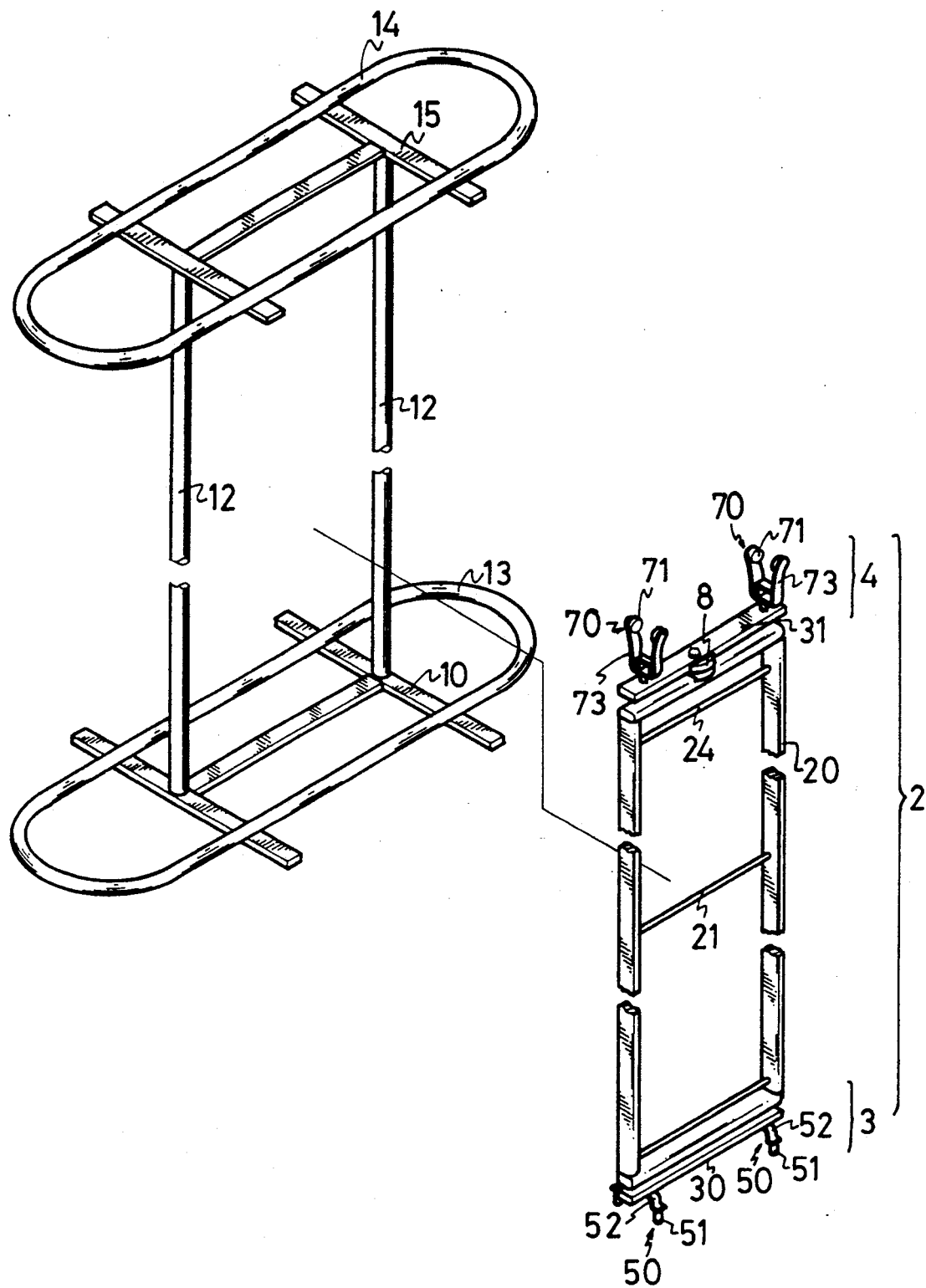
FIG. 2 is an exploded view of the clothing hanger assembly of FIG. 1, except that only one hanger is presented for simplification.
Figure 3:
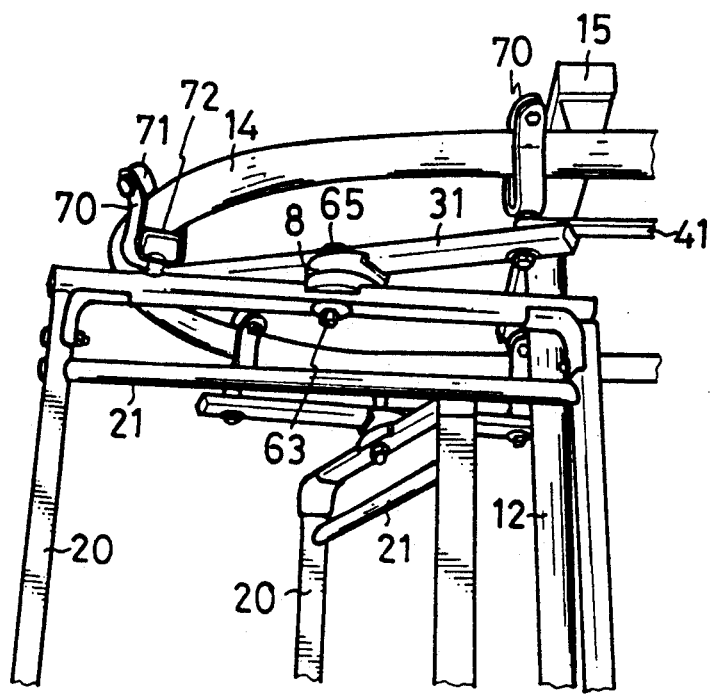
FIG. 3 is an upper portional view of the hanger assembly in accordance with the present invention.
Figure 4:
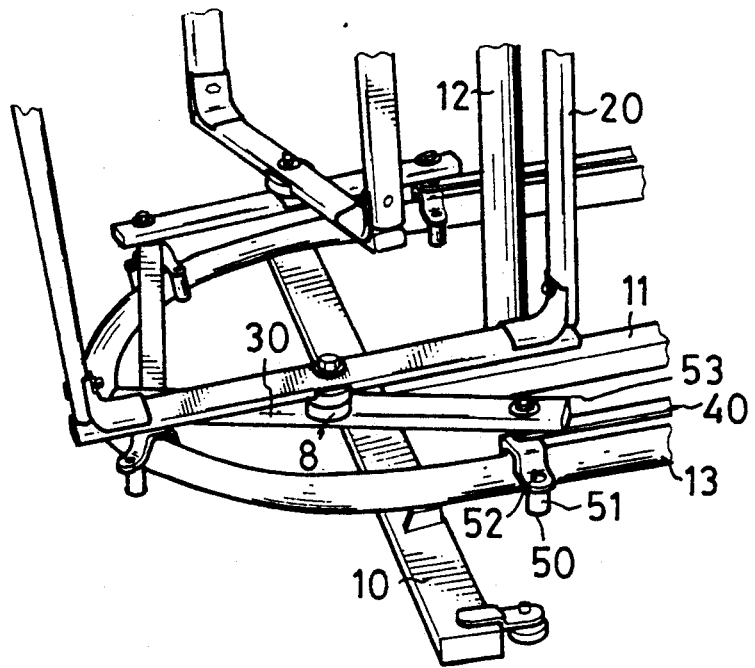
FIG. 4 is a lower counterpart of the hanger assembly of FIG. 3.

Referring to FIGS. 2 to 4, the hanger unit 2 is described in more detail. Each hanger unit 2 comprises an upper sliding means 4, a lower sliding means 3, and a clothing hanger frame 20 rotatably coupled therebetween. The upper sliding means 4 includes an upper rod 31 which is horizontally positioned under the upper track 14 and a pair of upper clamping means 70, each of which has a first end connected to each end of the upper rod 31 and a second end slidably hanging on the upper track 14. The lower sliding means 4 includes a lower rod 30 which is horizontally positioned above the lower track 13 and a pair of lower clamping means 50 each of which has a first end connected to each end of the lower rod 30 and a second end slidably positioned on the lower track 13. The clothing hanger frame 20 is rotatably coupled between the upper rod 31 and the lower rod 30 and has a first bar 24 mounted across an upper portion thereof and a second bar 21 mounted across a middle portion thereof for hanging clothing.

An upper linking bar 41 and a lower linking bar 40 are connected between two adjacent hanger units 2, such that all the hanger units 2 can be moved in concert along the upper track 14 and the lower track 13. The upper linking bar 41 has two ends, each of which is engaged between an upper clamping means 70 and a corresponding upper rod 31. The lower linking bar 40 has two ends, each of which is engaged between a lower clamping means 50 and a corresponding lower rod 30.

Figure 5:
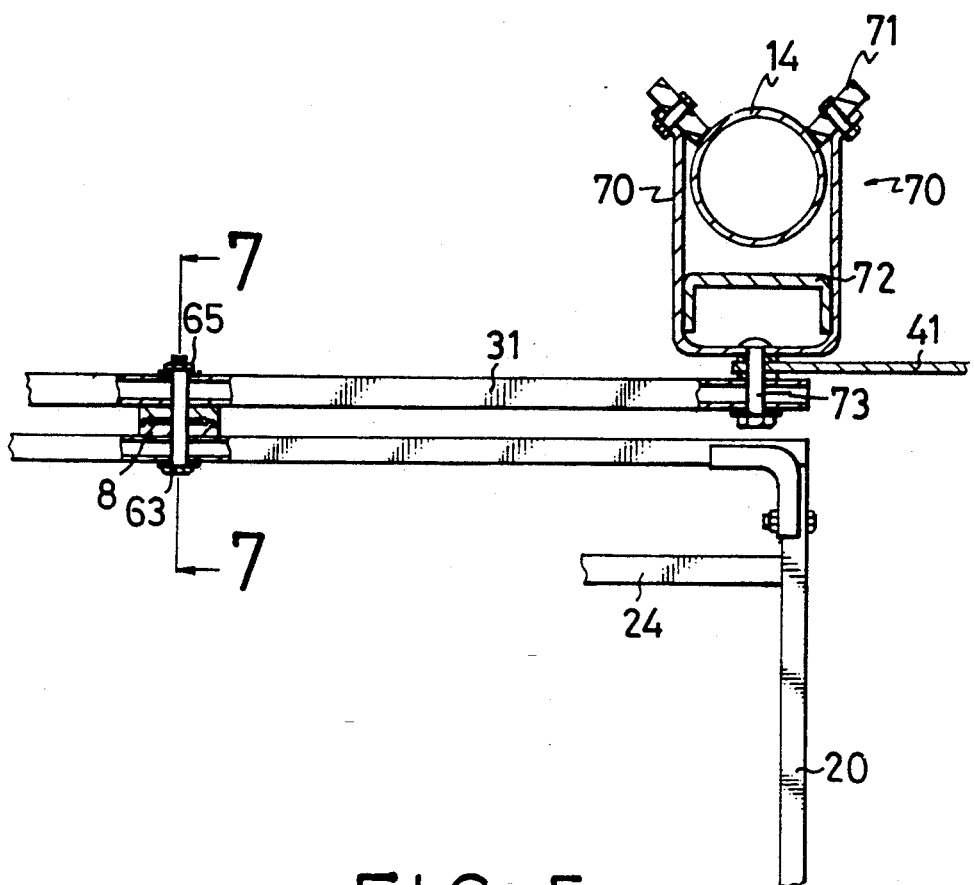
FIG. 5 is a portional view of FIG. 3 in more detail.

Referring to FIGS. 2 and 5, the upper clamping means 70 comprises a U-shaped fork 73 which encloses a longitudinal section of the upper track 14 and two upper rollers 71 which are mounted at each prong of the fork 73 for contacting with and sliding along the upper track 14. The upper clamping means 70 further comprises an inverse U-shaped support plate 72 attached to two inner walls of the U-shaped fork 73 under the upper track 14 for strengthening the inner walls of the U-shaped fork 73.

Figure 6:
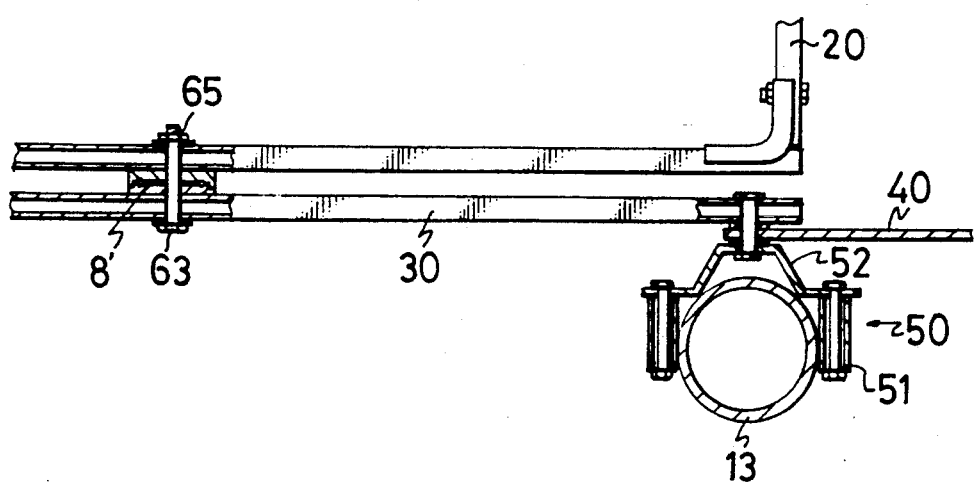
FIG. 6 is a portional view of FIG. 4 in more detail.

Referring to FIGS. 2 and 6, the lower clamping means 50 comprises an inverse U-shaped fork 52 which encloses a longitudinal section of the lower track 13 and two lower rollers 51 mounted at each prong of the inverse U-shaped fork 52 for contacting with and sliding along the lower track 13.

Referring to FIGS. 5 and 6, an upper bearing means 8 is pivotally coupled between the upper rod 31 and an upper side of the clothing hanger frame 20 and a lower bearing means 8' pivotally coupled between the lower rod 30 and a lower side of the clothing hanger frame 20 such that the clothing hanger frame 20 can make a free rotation about an axis therethrough when it is manipulated by a user.

Figure 7:
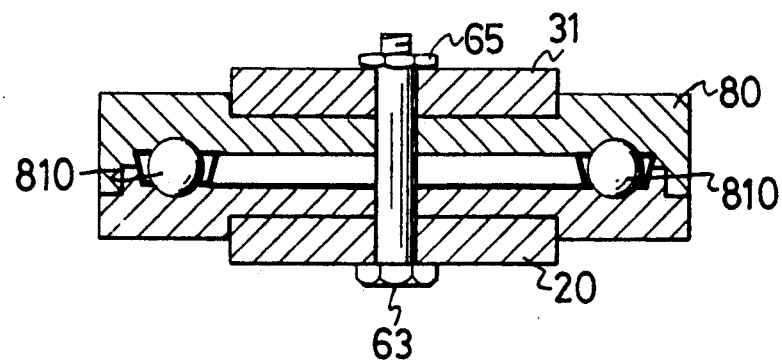
FIG. 7 is a sectional view from line 7—7 of FIG. 5 illustrating the coupling between an upper rod and an upper side of a clothing hanger frame by an upper bearing means of the present invention.

FIG. 7 illustrates the relationship of the upper bearing means 8 rotatably coupled between the upper rod 31 and the upper side of the clothing hanger frame 20. The relationship between the lower side of the clothing hanger frame 20 and the lower rod 30 is the same. The upper bearing means 8 and the lower bearing means 8' are identically constructed.

Figure 8:
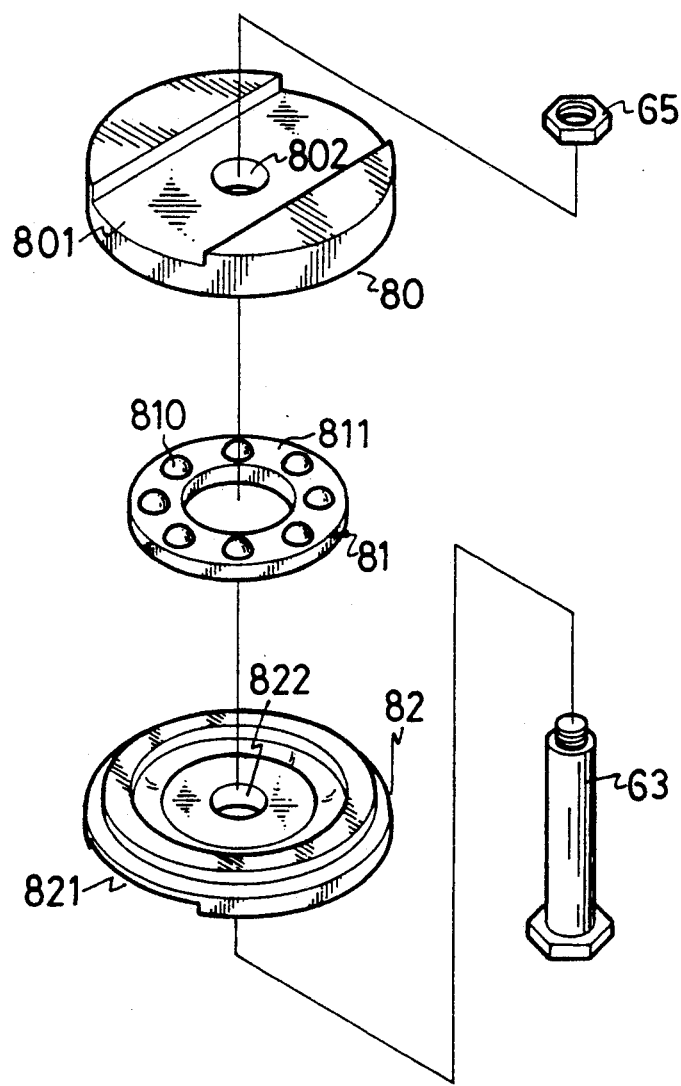
FIG. 8 illustrates an exploded view of the upper bearing means of FIG. 7, while a lower bearing means coupled between a lower side of the clothing hanger frame and a lower rod has an identical structure.

Referring to FIG. 8, the upper bearing means 8 (also the lower bearing means 8') comprises an upper housing 80, a lower housing 82 which is complementary to the upper housing 80, and a ring bearing 81 received therebetween to allow the upper housing 80 to rotate with respect to the lower housing 82. The structure of the ring bearing 81 can be seen more clearly refers to FIG. 7. The ring bearing 81 comprises a ball retainer 811 and eight balls 810 being rotatable in the ball retainer 811. The ball retainer 811 is shaped as a ring shell with eight holes at a top surface thereof, an inner wall and an outer wall extending from the top surface and slanting downward thereby holding the balls 810. The upper housing 80 has an upper recess 801 for receiving/holding a longitudinal section of the upper rod 31. The lower housing 82 has a lower recess 821 for receiving/holding a longitudinal section of the upper side of the clothing hanger frame 20. An upper hole 802 is formed in the center of the upper housing 80 and a lower hole 822 is also formed in the center of the lower housing 82, such that both holes 802 and 822 are in alignment with each other. A bolt 63 is installed through the upper hole 802 and the lower hole 822 to secure the upper housing 80 to the upper rod 31 and the lower housing 82 to the upper side of the clothing hanger frame 20 by cooperating with a nut 65, such that the clothing hanger frame 20 can rotate relative to the upper rod 31 and the lower rod 30 when manipulated by a user.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A rotatable clothing hanger assembly comprising:
a rack having an upper rack frame, a lower rack frame and a pair of spaced posts connected therebetween;
an upper loop track and a lower loop track respectively supported by said upper rack frame and said lower rack frame; and
a plurality of spaced hanger units slidably mounted between said upper loop track and said lower loop track, each said hanger unit comprising an upper sliding means, and a clothing hanger frame rotatably coupled therebetween to allow free rotation of said clothing hanger frame relative to said upper sliding means and said lower sliding means when manipulated;
each adjacent upper sliding means being pivotally linked, and each adjacent lower sliding means being pivotally linked, such that said hanger units are capable of revolving in concert with each other along said upper track and said lower track when manipulated;
said upper sliding means including an upper rod positioned under said upper track and a pair of upper clamping means each having a first end mounted on each end of said upper rod and a second end slidably hung on said upper track;
said lower sliding means including a lower rod above said lower track and a pair of lower clamping means each having a first end mounted on each end of said lower rod and a second end slidably positioned on said lower track;
an upper bearing means being rotatably coupled between said upper rod and an upper side of said clothing hanger frame; and
a lower bearing means being rotatably coupled between said lower rod and a lower side of said clothing hanger frame, allowing said clothing hanger frame to have a free rotation about an axis therethrough when manipulated.

2. The rotatable clothing hanger assembly of claim 1, wherein said clothing hanger frame has a first bar mounted across a middle portion thereof and a second bar mounted across a middle portion thereof for hanging clothing.

3. The rotatable clothing hanger assembly of claim 1, wherein adjacent upper sliding means are connected by an upper linking bar, and adjacent lower sliding means are connected by a lower linking bar, said upper linking bar having two ends, each of which is pivotally coupled between one of said upper clamping means and a corresponding upper rod, said lower linking bar having two ends, each of which is pivotally coupled between one of said lower clamping means and a corresponding lower rod.

4. The rotatable clothing hanger assembly of claim 1, wherein said upper clamping means comprises a U-shaped fork enclosing part of said upper track and having two upper rollers mounted at two prongs thereof for contacting with and sliding along said upper track.

5. The rotatable clothing hanger assembly of claim 4, wherein said upper clamping means further comprises an inverted U-shaped support plate attached to two inner walls of said U-shaped fork under said upper track for strengthening the inner walls of said U-shaped fork.

6. The rotatable clothing hanger assembly of claim 1, wherein said lower clamping means comprises an inverted U-shaped clamp enclosing part of said lower track and having two lower rollers mounted at two ends thereof for contacting with and sliding along said lower track.

7. The rotatable clothing hanger assembly of claim 1, wherein each of said upper bearing means and said lower bearing means comprises an upper housing, a lower housing which is complementary to said upper housing, and a ring bearing received therebetween, said upper housing having an upper recess for longitudinally receiving said upper rod and an upper hole, said lower disk cap having a lower recess for longitudinally receiving said upper side of said clothing hanger frame and a lower hole, a bolt inserted into said upper hole and said lower hole to secure said upper housing to said upper rod and to secure said lower housing to said upper side of said clothing hanger frame, allowing said clothing hanger frame to have a relative rotation between said upper rod and said lower rod when manipulated.

8. The rotatable clothing hanger assembly of claim 7, wherein the ring bearings of the upper and lower bearing means comprises a ball retainer and a plurality of balls rotatable in the ball retainer.

* * * * *